United States Patent
Vilppula et al.

(10) Patent No.: US 7,558,696 B2
(45) Date of Patent: Jul. 7, 2009

(54) METHOD AND DEVICE FOR POSITION DETERMINATION

(75) Inventors: Matti Vilppula, Pirkkala (FI); Arto Mattila, Lempäälä (FI); Markku Niemi, Tampere (FI)

(73) Assignee: Nokia Corporation, Espoo (FI)

( * ) Notice: Subject to any disclaimer, the term of this patent is extended or adjusted under 35 U.S.C. 154(b) by 928 days.

(21) Appl. No.: 09/897,004

(22) Filed: Jul. 2, 2001

(65) Prior Publication Data

US 2002/0019698 A1 Feb. 14, 2002

(30) Foreign Application Priority Data

Jun. 30, 2000 (FI) ................................. 20001576

(51) Int. Cl.
*G01C 9/00* (2006.01)
(52) U.S. Cl. ...................................... 702/150
(58) Field of Classification Search ................ 702/150, 702/95; 455/456, 7, 414, 427, 457, 450, 455/456.1, 456.2, 456.3, 456.4, 456.5, 456.6; 701/213, 207; 342/35, 357.1, 463, 465, 357.06, 342/367.06, 357; 709/223
See application file for complete search history.

(56) References Cited

U.S. PATENT DOCUMENTS 5,208,763 A * 5/1993 Hong et al. .................... 702/95
5,999,126 A * 12/1999 Ito ............................ 342/357.1
6,002,936 A * 12/1999 Roel-Ng
6,078,818 A * 6/2000 Kingdon
6,252,543 B1 * 6/2001 Camp .................... 342/357.06
6,738,808 B1 * 5/2004 Zellner et al. ............... 709/223
6,999,779 B1   2/2006 Hashimoto ............... 455/456.2

FOREIGN PATENT DOCUMENTS

| EP | 0763749 A1 | 3/1997 |
| GB | 2322248 A * | 8/1998 |
| WO | 99/61934 A1 | 12/1999 |
| WO | WO 99/61934 | 12/1999 |

* cited by examiner

*Primary Examiner*—Tung S Lau
*Assistant Examiner*—Xiuquin Sun
(74) *Attorney, Agent, or Firm*—Perman & Green LLP

(57) ABSTRACT

A method and device for position determination, in which one or more application (201, 202) requests a positioning method selection device (204) for positioning data. The positioning method selection device provides an application with positioning data using one or more positioning method (205 to 209) in accordance with settings defined by the application and/or the user. The positioning method selection device (204) receives a positioning request from an application (201, 202), forms a parameter or parameters indicating the quality of positioning requested by the application, compares the quality of positioning data provided by the positioning methods with the positioning quality required by the application, and sends positioning data to the application (201, 202) in response to the positioning request.

31 Claims, 8 Drawing Sheets

METHOD AND DEVICE FOR POSITION DETERMINATION

Figure 1:
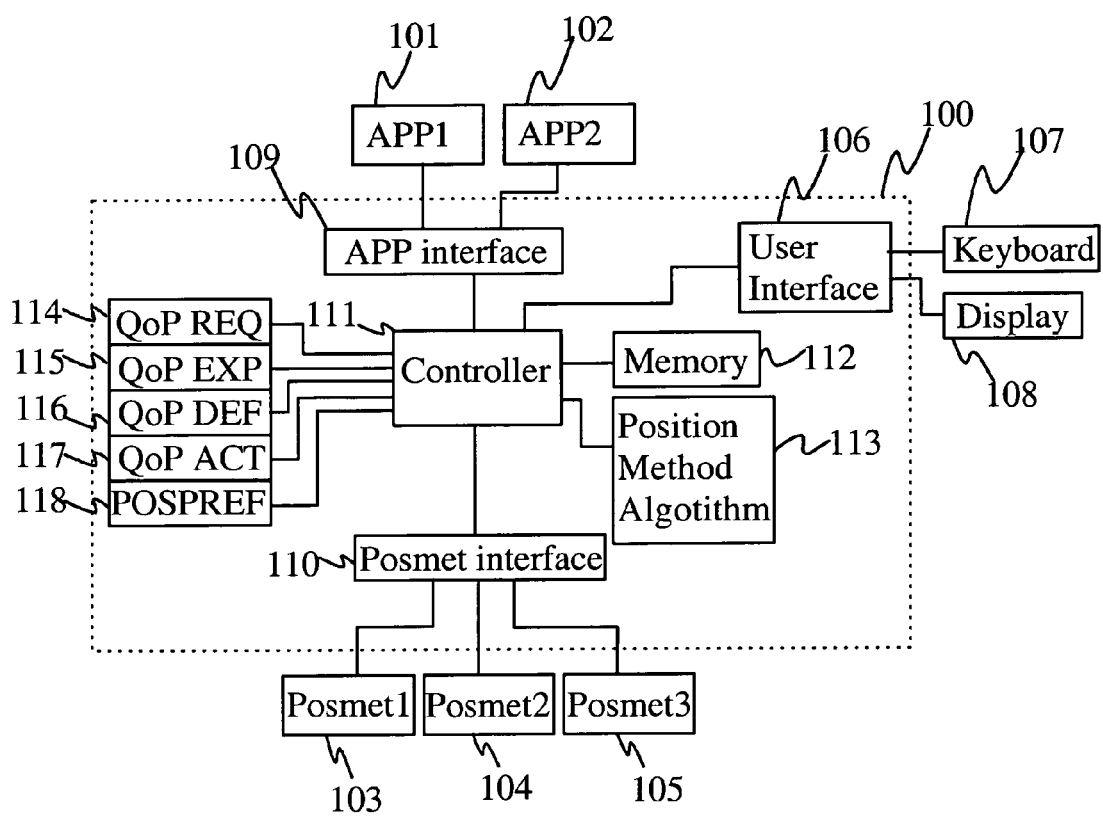

The present invention relates to a method and device for the determination of position.

BACKGROUND OF THE INVENTION

The integration of different positioning methods into portable terminal devices has made it possible for a user of such a terminal to determine his/her geographical position. The use of satellites for the determination of position has given rise to the global GPS navigation system (Global Positioning System). The evolution of mobile communication systems and mobile terminals has also given rise to other types of positioning method, for example the E-OTD (Enhanced Observed Timing Difference) system, which is based on the measurement of differences in reception times of signals sent by several base stations at a mobile terminal.

In the development of methods and devices for the determination of position, emphasis has so far been placed mainly on the interaction between one application used in the device and one positioning method. An example of this kind of device is a portable GPS navigation device, which enables a user of the device to determine his/her position using the Global Positioning System and to display positioning information including, for example longitude and latitude information, on a display of the device. Since the reliability of different positioning methods under different geographical conditions varies, the problems that this may cause to the user of the device have been solved by enabling more than one positioning method to be used in a single terminal. In this way, the most suitable positioning method for any given situation can be used e.g. by selecting the method to be used from more than one available alternative. For example, the GPS positioning system is particularly well suited for use when travelling by road in a vehicle. In locations where the reliability of the GPS system is not the best possible, such as inside buildings, other positioning methods that function better can be used, for instance the E-OTD or TOA (Time to Arrival) methods.

A method and a device of this kind are presented in patent publication GB 2 322 248 A, in which the terminal comprises a single positioning application, capable of using several different positioning systems and changing the positioning method automatically if the positioning method in question becomes inoperative. In GB 2 322 248, the application using the positioning data provided by the various positioning methods, only provides the user with information that relates to the determination of position. In other words, the application only makes limited use of the positioning data. In the future, however, as applications further develop and diversify, different applications in mobile terminals will utilise positioning information to an increasing extent and in more complex and varied ways, not limited to the straightforward presentation of positioning-related information, to the user of the device. It is likely that a single terminal will comprise several applications and services utilising positioning information as well as several available positioning methods. For example, it is likely that future mobile terminals, for example, those developed in connection with 3rd generation mobile communication networks, will provide far more varied positioning-based applications than currently available. These applications may include, for example, navigation systems incorporating map-based displays for tracking the user's position, or applications designed to locate a particular type of service or retail outlet closest to the user's current location.

As the number of applications in a mobile terminal that require access to positioning data increases and the number of different positioning methods to which an application may have access also increases, a need will arise to manage and control the use of the positioning methods by the applications in an efficient manner. The need for efficient control of the positioning methods by the applications will become even more important as the complexity of the positioning-related tasks performed by the applications increases.

SUMMARY OF THE INVENTION

Now, a method and a device for the determination of position has been invented, by means of which positioning methods integrated in and connectable to a terminal device, or provided by a mobile communication network, for example, can be used by more than one application with the aid of a positioning method selection device (PMSD). By means of the invention, one or more application can either simultaneously or at different times obtain and use positioning data provided by one or more positioning method via the PMSD.

At any given time, the PMSD can automatically determine the best possible positioning method available for use by the terminal's applications, based on requirements specifying the quality of service (Quality of Positioning, QoP) defined by the user or the application, without having to know the behaviour of the available positioning methods under different conditions. By using a positioning method selection device according to the invention, the number of tasks to be performed by the applications in use decreases, because each application requests positioning data in a centralised way, from the positioning method selection device, not from each positioning method separately. Thus, the PMSD functions as an interface between the applications and the positioning methods which manages and controls the use of the various positioning methods by the applications and ensures that the positioning data provided corresponds as closely as possible with the quality requirements specified by the user and/or application.

In a method according to the invention, each available application in the terminal sends a positioning request to the positioning method selection device when it requires positioning information. The PMSD knows the number of positioning methods available at any given time and their operating state at that time (e.g. in use/not in use) as well as their performance under the prevailing conditions. The applications do not have to know which positioning method is used at a particular time or how and in which format each positioning method provides the positioning data requested by the application.

Particularly, but not necessarily, when a terminal device is used for personal position determination, for example like a GPS locator, in such a way that the user attempts to determine his/her location with the aid of the terminal device, the PMSD can take into account user conditions, such as the order of preference of the different positioning methods, i.e. which positioning method the user wishes to use as first choice, provided that the positioning method in question is available for use. Furthermore, the user can define which positioning methods he/she wishes the PMSD to use at a particular time by allowing or forbidding the use of certain positioning methods. The user can specify conditions relating to the selection of the positioning methods directly to the PMSD (independent of the application) via a user interface, rather than via the application he/she is using. This advantageous feature reduces and simplifies the exchange of information between the applications and the PMSD. The conditions set by the user relating to selection of a positioning method can also comprise the desired accuracy of the requested positioning data (e.g. longitudes, latitudes, distance from a given point). Since each positioning method has its own characteristic performance and properties, the PMSD is capable of selecting a certain positioning method for use in connection with a positioning request from a particular application in accordance with the task to be performed by the particular application.

Settings performed in a centralised manner for the PMSD affect all applications directly, so the user does not have to perform the settings for each application separately. When a service, to which a connection has been made e.g. by means of a WAP (Wireless Application Protocol) or other browser, requests the browser to provide information relating to its location with a certain accuracy, the location information is ultimately expressed according to the conditions set by the user. For example, the browser application will not communicate location information to the service if the user has stipulated positioning methods for use at that time which cannot provide positioning data with the accuracy requested by the application. Alternatively, the user can define in advance the positioning methods from which each particular application can receive location information from the PMSD. This is an advantageous feature, particularly if the cost of using a positioning method is based on the number of times positioning data is requested.

The PMSD can also detect positioning methods connected via the terminal device which are taken into use or removed from use. For example, when the terminal device is used in a car, the user can connect the terminal to the car's navigation system, such as a GPS system, via a serial port or other equivalent port or connector. In this way, it is possible to make use of the car's own positioning system, which is possibly more accurate and versatile (e.g. providing map data and other information on road networks) than the terminal's internal GPS locator. Alternatively, the car's system can be used if the terminal does not have an internal GPS device.

On arrival at his/her destination by car, the user takes the terminal with him/her, whereupon the external GPS system is no longer available for use by the PMSD, and the PMSD searches for the most suitable method from the available positioning methods, or that defined in advance by the user, for example the internal GPS device of the terminal. When the user enters a building, the terminal's internal GPS receiver may enter a environment where it is not able to receive the necessary satellite signals (a so-called dead region), in which case its operation is prevented. In this situation, the PMSD searches once more among the available positioning methods for a new system, such as the E-OTD or Bluetooth system or WLAN services, which operate better indoors. In other words, the PMSD automatically registers which positioning devices/methods are available for use. External positioning devices can be detected, for example, on the basis of connections to the terminal's connectors or in other equivalent ways known in the art. Applications can also inform the PMSD of their requirements automatically.

According to a first aspect of the invention, there is provided a method for the determination of position using one or more positioning method, wherein a positioning method selection device is provided for centrally managing the use of said one or more positioning method.

Advantageously, a method according to the first aspect of the invention comprises the steps of:
　　maintaining a centralised register on at least one positioning property of said one or more positioning method;
　　maintaining a centralised register comprising at least one specified condition for selecting a positioning method;
　　allowing one or more application program to send a positioning request; and
　　selecting a positioning method for use that fulfils at least one specified condition for selecting a positioning method.

According to a second aspect of the invention, there is provided a device for the determination of position using one or more positioning method, comprising a positioning method selection device for centrally managing the use of said one or more positioning method.

Advantageously, a device according the second aspect of the invention comprises:
　　first maintaining means for maintaining a centralised register on at least one positioning property of said one or more positioning method;
　　second maintaining means for maintaining a centralised register on at least one specified condition for selecting a positioning method;
　　means for allowing a positioning request to be sent by one or more application program;
　　selection means for selecting a positioning method for use that fulfils at least one specified condition for selecting a positioning method.

According to a third aspect of the invention, there is provided a computer program product for the determination of position using one or more positioning method, comprising computer program means implementing a positioning method selection device for centrally managing the use of said one or more positioning method.

Advantageously, a computer program product according to the third aspect of the invention comprises:
　　computer program means for maintaining a first centralised register on at least one positioning property of said one or more positioning method;
　　computer program means for maintaining a second centralised register on at least one specified condition for selecting a positioning method;
　　computer program means for allowing a positioning request to be sent by one or more application program;
　　computer program means for selecting a positioning method for use that fulfils at least one specified condition for selecting a positioning method.

By means of the invention, one or more application can request the PMSD for positioning data in accordance with a parameter value (or values) indicating the quality of the positioning required, the PMSD using one or more positioning method to provide positioning data of the required quality to the application(s). The application (or applications) form the parameter value or values indicating the quality of the positioning required, and send it (them) to the PMSD, whereupon the PMSD is able to select the most suitable positioning method to provide the positioning data on the basis of the received parameter (or parameters) and provides the positioning data to the application (or applications) in the correct format, i.e. in a format requested by the application. The PMSD can also form the positioning data by combining data from several positioning methods to achieve the best possible positioning accuracy.

The application can either form one parameter value, in which case accuracy can be a criterion, for example. Alternatively, it can form several parameters, in which case, in addition to accuracy, the parameter value (or parameter values) can be cost, if use of the positioning method is subject to a charge, or the speed at which the positioning method provides positioning data. It should be noted that the parameter values are not limited to the above examples, but other parameters can also be used.

The user can define conditions relating to the positioning methods, such as an order of preference and whether the user wishes a certain positioning method to be available for use or removed from use, directly to the PMSD. Because positioning methods are usually provided as commercial services and the cost of using the service incurred by the user is based on the number of times positioning data is requested, it is considerably more expensive if each application accesses the positioning methods independently. The method and device according to the invention therefore have the advantage of reducing the cost to the user of using positioning methods, as several applications can use positioning data already acquired by one application, via the PMSD.

Figure 2:
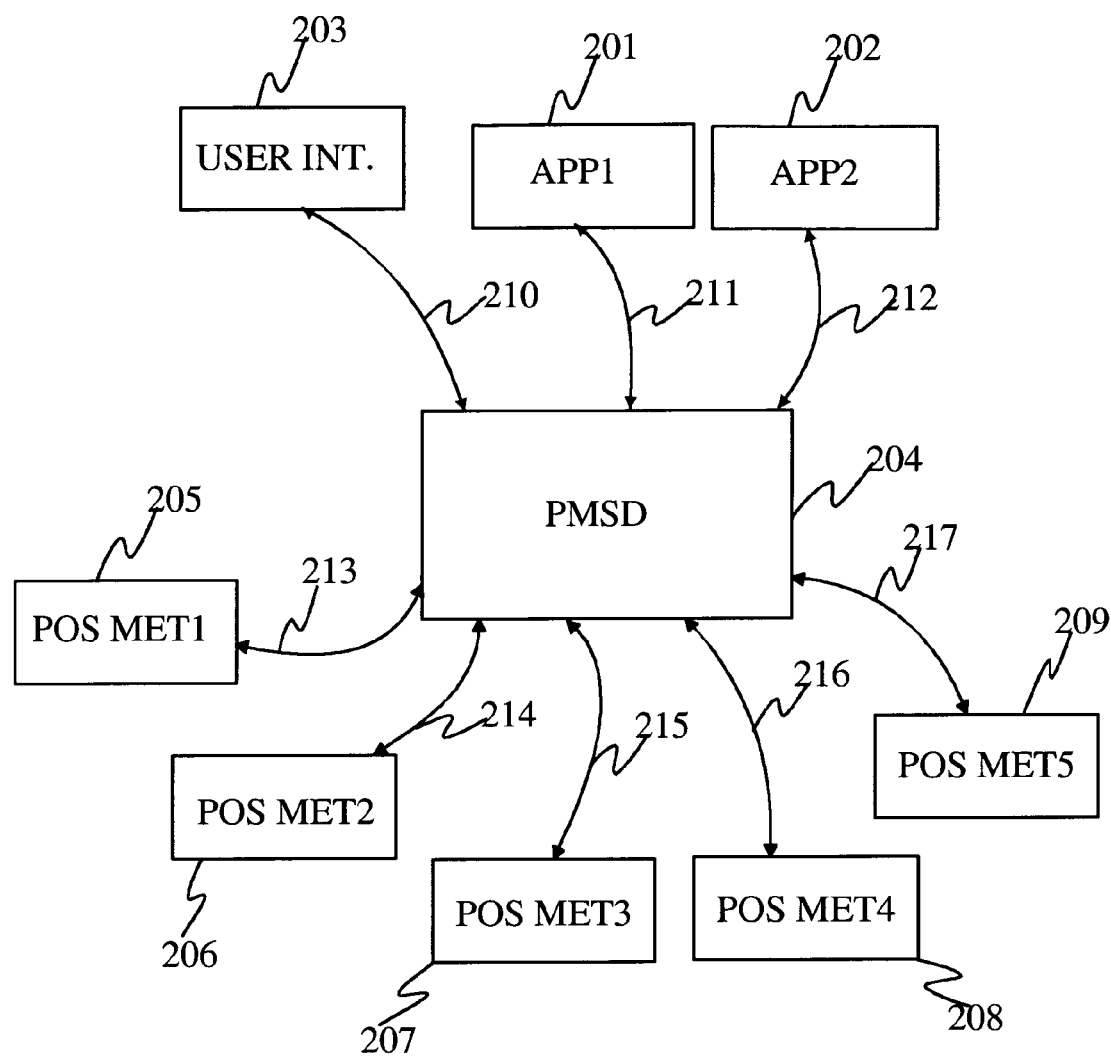
Figure 3:
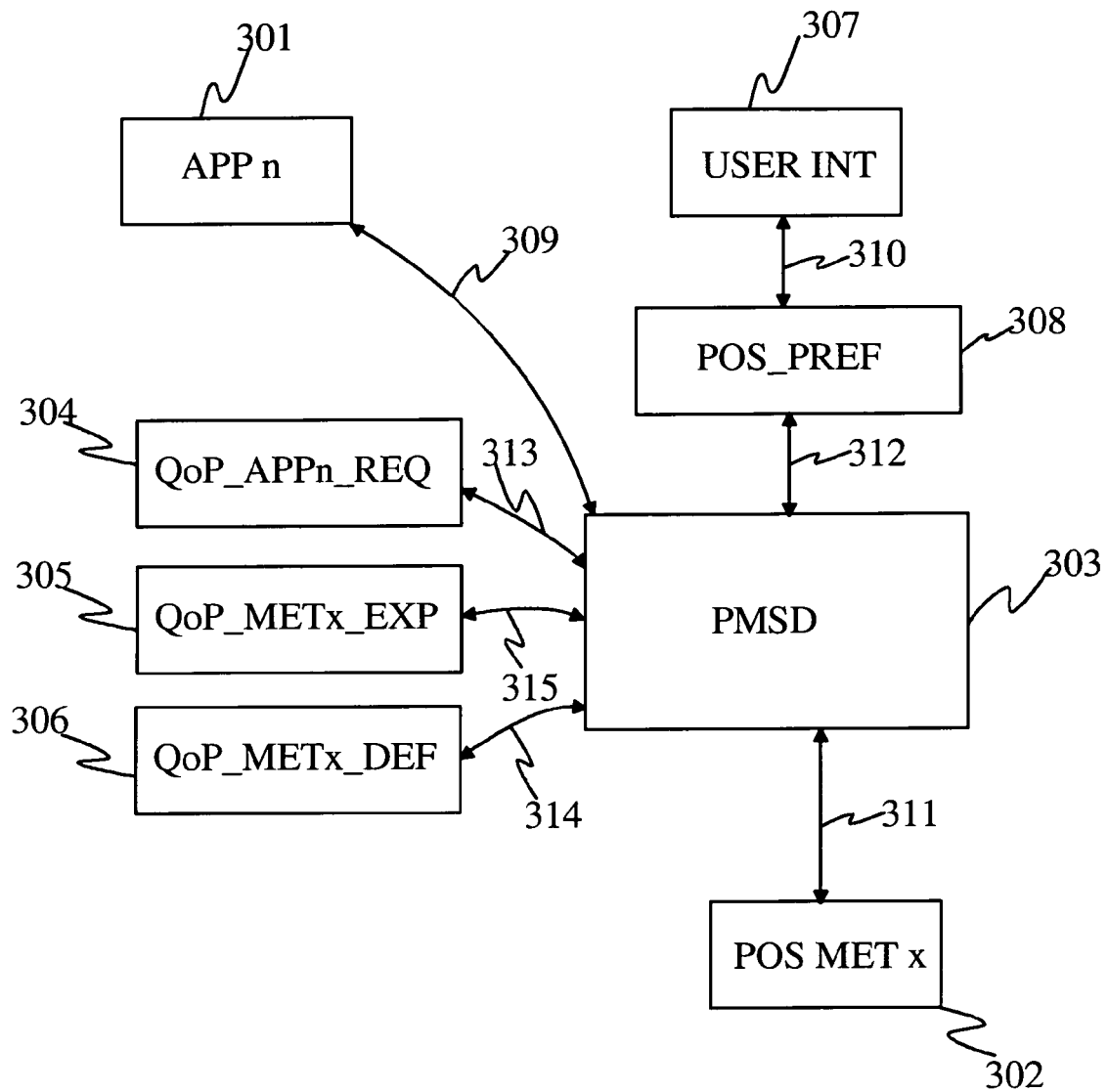
Figure 4:
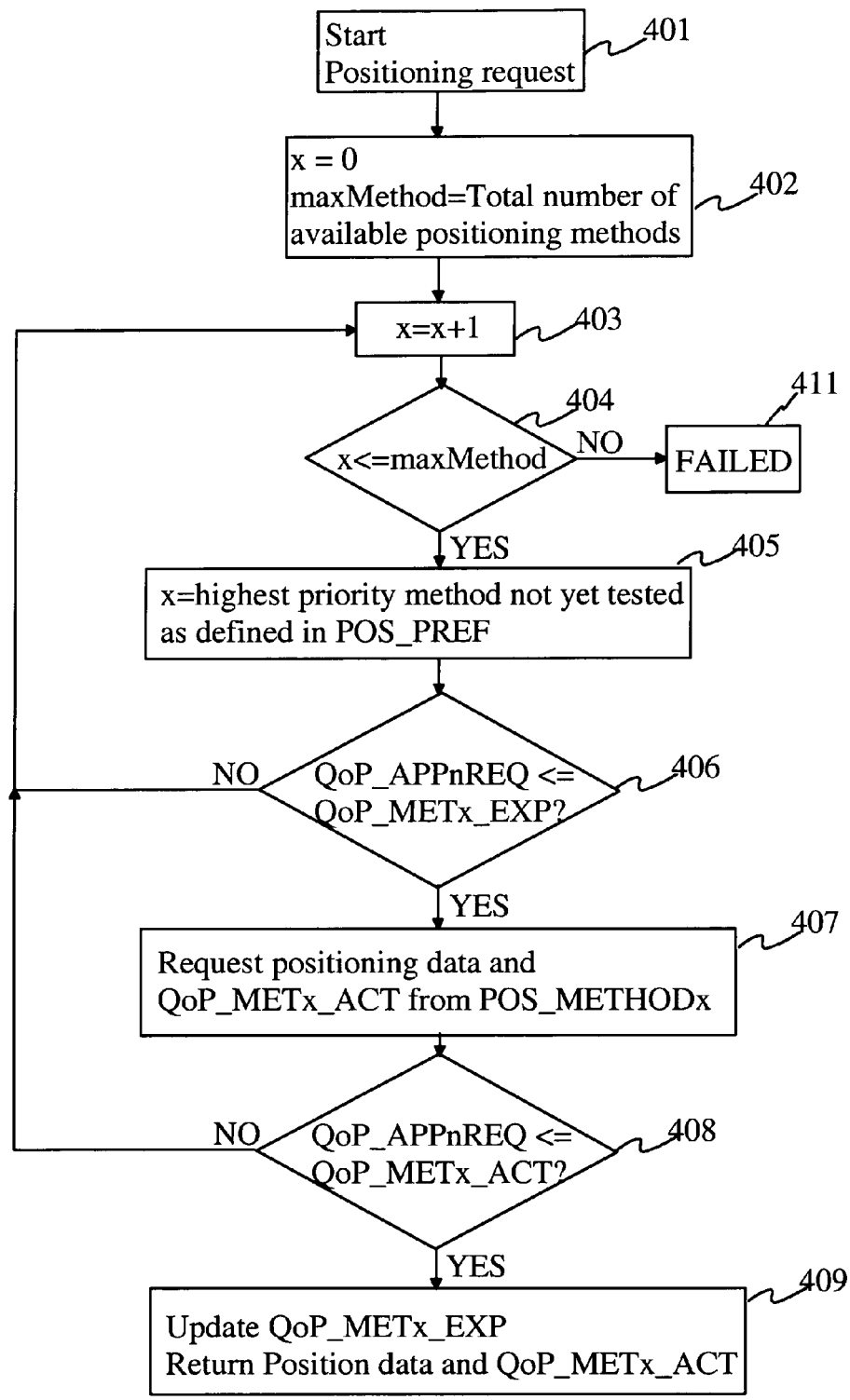
Figure 5:
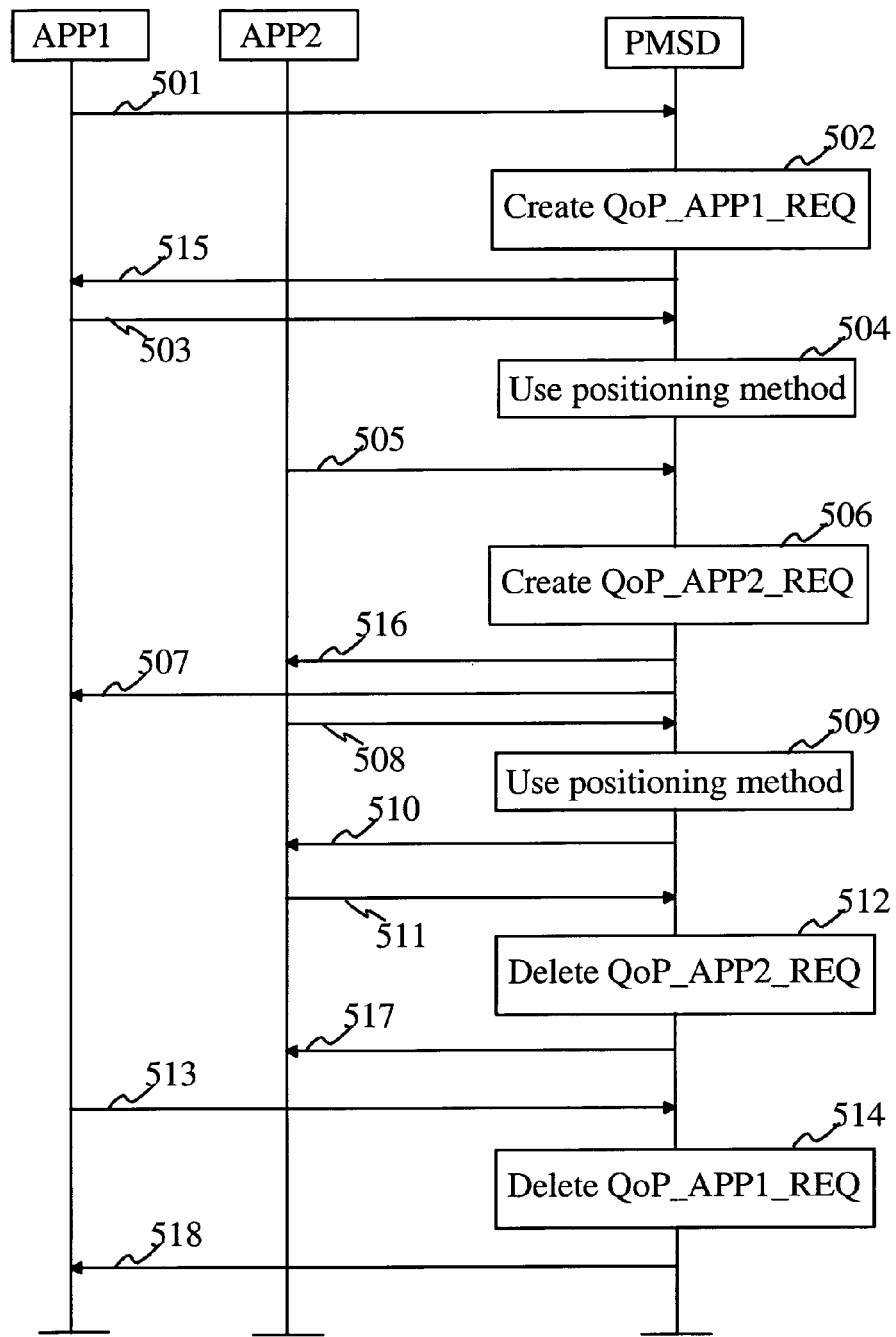
Figure 6:
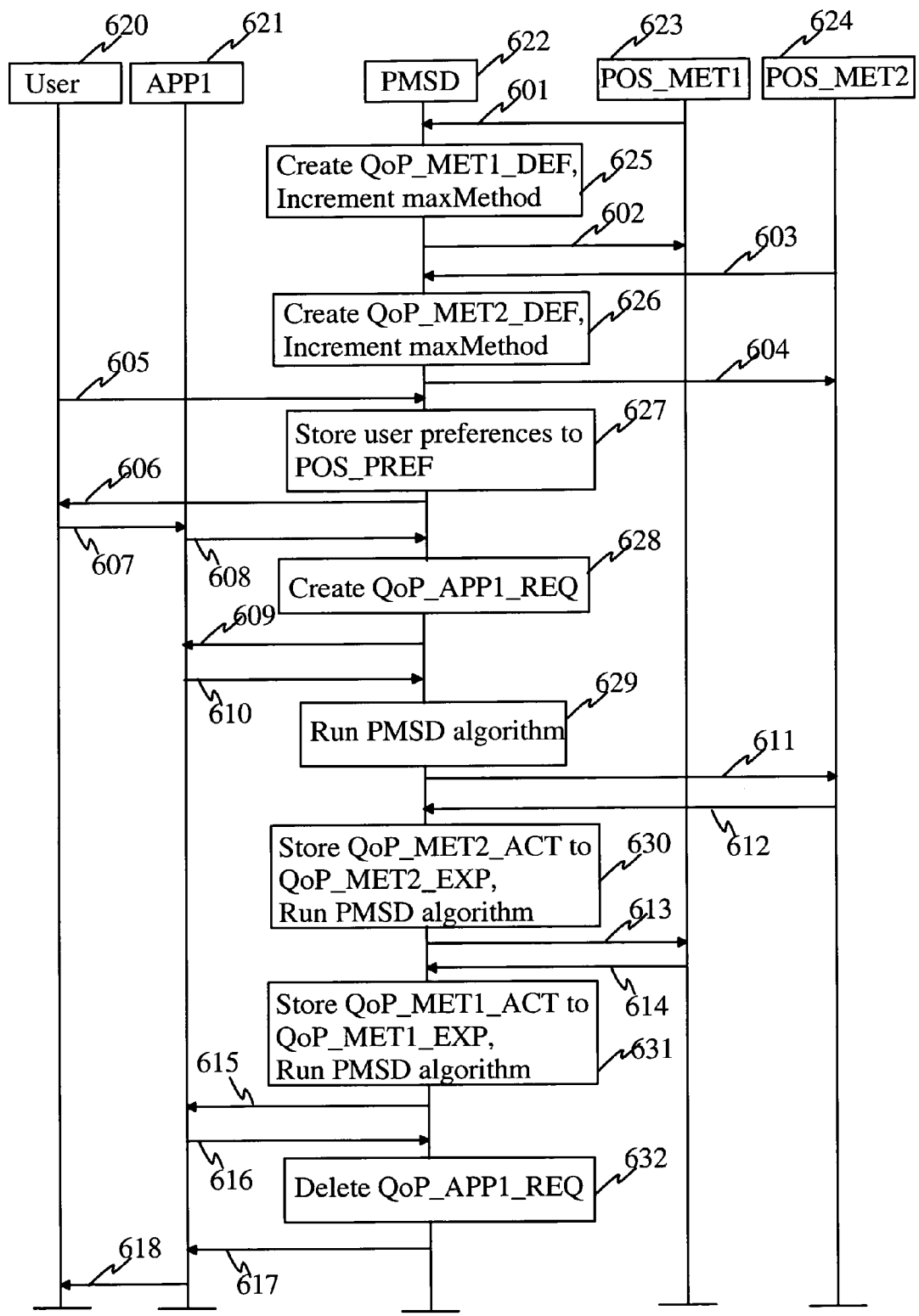
Figure 7:
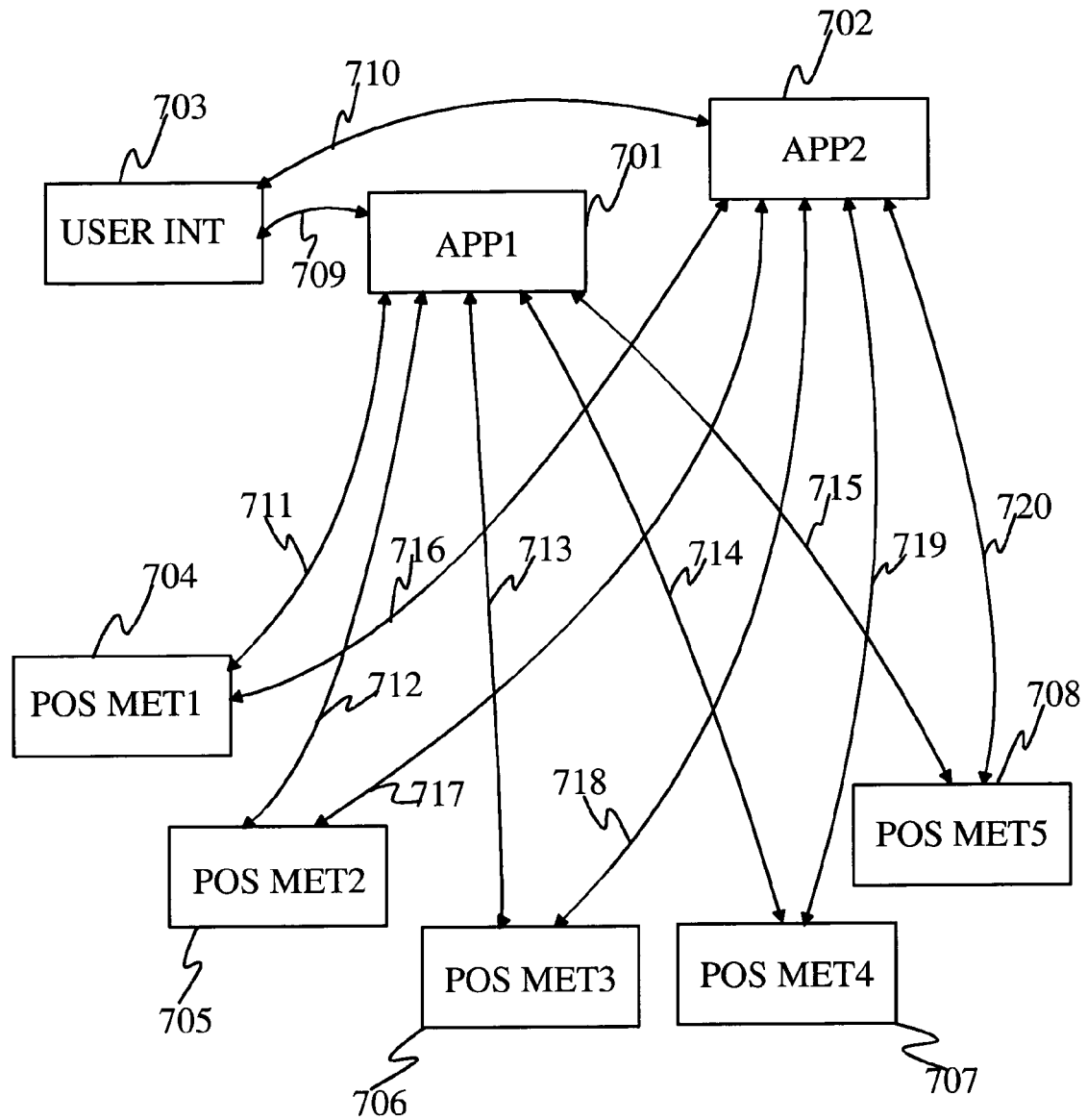
Figure 8:
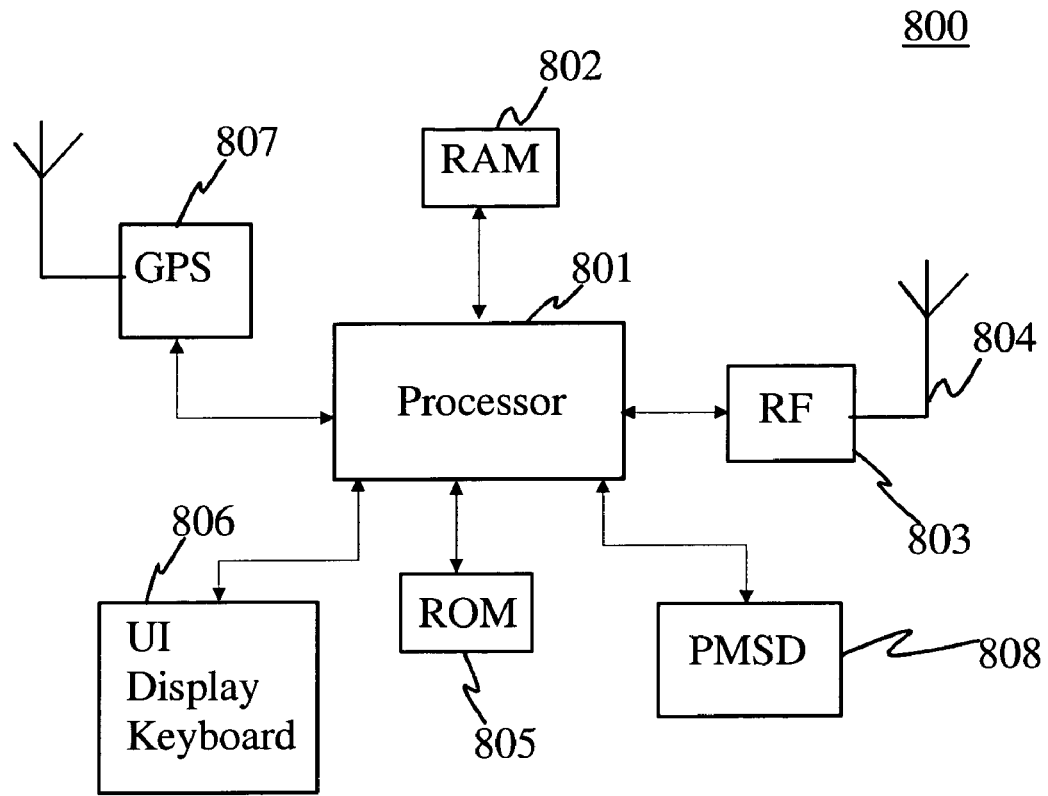

In the following, a system according to the invention will be described in greater detail with reference to drawings 1 to 8, in which FIG. 1 illustrates a block diagram of a device according to the invention, in which a method for the selection of a positioning method according to the invention is implemented;

FIG. 2 illustrates interaction between positioning methods and applications, using a positioning method selection device according to the invention;

FIG. 3 presents a general description of a method according to the invention;

FIG. 4 presents a flow diagram showing the operation of a positioning method selection device according to the invention;

FIG. 5 presents a signalling diagram showing the interaction between two different applications and a positioning method selection device according to the invention;

FIG. 6 presents a signalling diagram showing the operation of a device according to the invention when there are two different positioning methods in use;

FIG. 7 illustrates interaction between positioning-based services and applications without a positioning method selection device according to the invention; and FIG. 8 presents a block diagram of a mobile terminal according to an embodiment of the invention.

FIG. 1 illustrates a block diagram of an exemplary embodiment of a positioning method selection device PMSD (100) according to the invention. By way of example, two different applications 101 and 102, as well as three different positioning methods are presented; however, the number of applications and positioning methods is not limited to the previously mentioned numbers. Applications 101 and 102 request positioning data via the PMSD, which further uses information received from positioning methods 103 to 105 to form the positioning data. The user can define parameters relating to positioning tasks and the positioning methods, by means of a user interface 106 to 108. Said parameters are stored in a register 118.

The applications 101, 102 connect to the PMSD device via interface 109, by requesting the PMSD for positioning data. Applications 101 and 102 are able to define parameters relating to the positioning data requested, such as a required accuracy or the type and format of the positioning data, for example.

Positioning methods 103 to 105 are connected to the PMSD through an interface 110. The interface 110 can comprise, for example, a serial port or the like for the connection of an external positioning method, as well as interfaces for positioning methods integrated in the terminal and, for example, for positioning-related services provided by a mobile communication network.

Control means 111 to 113 control the operation of the various functional blocks of the PMSD as well as data transmission between them. The control means comprise a controller 111, which can be implemented, for example, as a microprocessor or equivalent means for controlling the functions of the PMSD. The control means further comprise a random access memory 112; as well as a permanent memory 113 for storing commands required for the control of the PMSD functions.

The parameter (or parameters) describing the quality of the positioning data (Quality of Position QoP), such as the positioning accuracy requested by application n, is stored in a register 114, where n indicates the application in use and is an integer between 1 and the maximum number of applications. Said parameter (or parameters) can be received directly from each application automatically, depending on the operating state of the application or, for example, when the application is installed in the terminal.

A parameter (or parameters) describing the quality of the positioning data provided by positioning method x is stored in register 115, where x indicates the positioning method in use and is an integer between 1 and the number of available positioning methods. This parameter (or parameters) represents an expected value, according to which an application can expect the PMSD to provide it with data. Said parameter (or parameters) can be provided directly from each positioning method automatically, being up-dated, for example, at given intervals, or when a particular positioning method is taken into use.

Default values for the parameters describing the quality of the positioning data provided by positioning method x are stored in register 116. The PMSD can obtain parameters describing the quality of the positioning data from the positioning methods at given intervals, or monitor the situation continuously and update the default values when needed. A default value is a parameter value according to which the positioning method is able to supply positioning data to the PMSD.

The value of the parameter (or parameters) describing the quality actually achieved by the positioning data provided by method x is stored in register 117, when said positioning method returns the positioning data requested by application n to the PMSD. In addition to the implementation shown in FIG. 1, the positioning method selection device can also be implemented as a computer program, in which case the functional blocks of the device are implemented as a program code.

FIG. 2 illustrates the interaction between positioning methods and applications, when using a positioning selection device (PMSD) according to the invention. By way of example, two different applications are shown, in this case a WAP browser 201 and a navigation guide 202, but other possible applications can also be used. Different positioning methods 205 to 209 are also shown, as well as a user interface 203, by means of which the user defines (ref. 210) positioning-related parameters. The positioning methods may include for example, the GPS and/or E-OTD system described earlier. The user may also be provided with an option to enter positioning data, such as a street address, geographical coordinates (e.g. latitude and longitude) or the like, directly via the user interface, or to access stored positioning data from a database, for example a contact card or position of interest (POI) database.

The PMSD (204) receives (ref. 211, 212) positioning requests from applications 201, 202, and forms a response to said positioning requests from the data provided by positioning methods 205 to 209, or by the user via the user interface. The PMSD can also receive information about the positioning accuracy of the positioning request, as well as information on the type and format of the positioning data requested by the application in question. The positioning requests and parameter(s) relating to a given positioning task may be received by the PMSD in a "one-off" manner when a particular application requires positioning data, or may be received continuously in a sequence. This situation may arise, for example, if the application in question is intended to provide the user with an up-to-date estimate of his/her position as he/she moves from place to place.

The PMSD 204 is also responsible for monitoring the functionality of the various positioning methods 205 to 209 under the prevailing conditions, and to always use (ref. 213 to 217) the most suitable positioning method to obtain the positioning data. When receiving repeated or continuous requests for positioning data from a given application, the PMSD can select an appropriate positioning method when it first receives a positioning request and use that method to supply positioning data in response to subsequent requests from the same application until the sequence of requests comes to an end. In an alternative embodiment of the invention, the PMSD makes use of its monitoring capability to select the best possible positioning method for each of the sequence of requests.

If positioning methods external to the terminal are also available, such as a GPS receiver of a car, the PMSD registers the possibility of using said external positioning methods, for example, by adding information about such external positioning methods to a list containing all available positioning methods. This list can be, for example, a preference list defined by the user, in which the new positioning method is set as the first-choice positioning method, for example. Correspondingly, when an external positioning method is removed from use by disconnecting an external positioning device from the mobile terminal, the PMSD removes said positioning method, for instance by deleting the data on said positioning method from the list of available positioning methods.

In an embodiment of the invention, the PMSD is further able to combine positioning data provided by more than one positioning method in order to achieve the positioning quality requested by a particular application. This may be done, for example, by receiving positioning data consecutively from more than one positioning method and combining the data in an appropriate manner to achieve the desired positioning quality. In an alternative embodiment, the PMSD may access previously stored positioning data obtained from any appropriate positioning method and combine that with newly received positioning data. In this embodiment, it is advantageous to associate a time-stamp with each positioning request, so that the most recently obtained positioning results can be selected for combination. A period of validity may also be defined for the positioning data, such that stored positioning data is deleted once its period of validity expires.

The user can define parameters relating to position determination directly to the PMSD 204 through the user interface 203 instead of giving definitions separately to each application 205 to 209. The user can define, for example, the accuracy with which applications 201, 202 receive positioning data or which positioning method 205 to 209 the user prefers to use as the first-choice positioning method. Depending on the application used, the parameter (or parameters) relating to position determination can also be provided automatically from the application in question, in so far as said application is capable doing of this. In this way, the task of the applications 201, 202 is simply to request positioning data from the PMSD 204. This means that they do not necessarily require any information about the operation of the various existing positioning systems 205 to 209 available to the PMSD or any other positioning systems that may be implemented in the future. When management of positioning methods is implemented in a centralised manner by the user and/or the applications acting directly on a PMSD, rather than in a decentralised way, separately for each positioning method, the applications' load in that respect can be decreased and some capacity can be diverted to other functions of the application. In some situations, it may nevertheless be advantageous to allow a particular application to select or use a positioning method directly. Thus, in an embodiment of the invention, it possible for any application to over-ride or disable the operation of the PMSD and to use any of the available positioning methods in a manner analogous to that known from prior art systems.

FIG. 3 illustrates the method according to the invention at a general level. The user can define parameters, which represent conditions on the basis of which a positioning method to be used is selected, through user interface 307. Said conditions can comprise, for instance, the positioning methods the user allows to be used by certain applications at a given time and the order in which the user prefers the positioning methods to be used. The parameters provided by the user are stored (ref. 310) in register 308, from which the PMSD can retrieve them (ref. 312). Parameters defined by the user can also include positioning accuracy, positioning reliability, the interval with which positioning data is updated, or the time that is permitted to elapse before the first positioning data is provided after a positioning method is activated. Other kinds of parameters can also be used, in addition to those mentioned above.

Application n (ref. 301), where n is an integer between 1 and the number of applications available, refers to the application in use at a particular moment, for example a WAP browser, which requests (ref. 309) the positioning method selection device (PMSD) 303 for positioning data. Parameters describing the quality of the positioning data requested by the application are sent (ref. 309) from the application 301 to the PMSD 303 and are stored in register 304 to be used in connection with the positioning request. This can be done either once, for instance when a new application is installed in the terminal, or when an application is activated. It can also be done in connection with every positioning request or when the required quality of the positioning data changes. The parameters defined by the user and stored in register 308 can also be used when selecting a positioning method to be used.

The PMSD 303 acquires (ref. 311) data on the available positioning methods, as well as the positioning properties of the positioning methods. Next, the PMSD 303 takes positioning method x into use (ref. 302), where x denotes the positioning method in question and is an integer between 1 and the total number of available positioning methods. Default values for the parameters describing the quality of the positioning data provided by the positioning methods are stored in register 306 and, as previously described, these default values represent the quality with which the positioning methods are able to provide the PMSD with positioning data. The default values can be stored beforehand or updated when the positioning method 302 provides (ref. 311) the PMSD with the first new value of a parameter (or parameters) under the prevailing conditions. The PMSD receives a new real-time parameter (or parameters) and stores (ref. 315) it/them in register 305. The PMSD selects a positioning method with the aid of a decision-making algorithm, an exemplary embodiment of which is shown in FIG. 4. The algorithm operates in such a way as to select a positioning method whose parameter (or parameters) describing the quality of the positioning achieved by the positioning method and stored in register 305 correspond best with the parameter (or parameters) in register 304 that describe the quality of the positioning data required by the application that made the positioning request, in accordance with the conditions specified by the user.

The decision-making algorithm illustrated by FIG. 4 will now be described in detail. At step 401 an application sends the PMSD a positioning request whereupon, at step 402, the PMSD sets the value of variable x, which indicates the positioning method under consideration at a given time to zero, and sets the value maxMethod, which indicates the total number of positioning methods, to correspond with the total number of position methods available to the PMSD at that time. At step 403, the value of variable x is incremented and the method proceeds to step 404, where the value of variable x is examined to determine if it is smaller than or equal to the total number of positioning methods maxMethod.

If the condition at step 404 is true and the value of x is less than or equal to the total number of positioning methods maxMethod, the method proceeds to step 405, where the highest priority positioning method in the order of preference defined by the user and/or application which is still untested is examined. The PMSD can monitor the number of available positioning methods and the operating state of each positioning method, or each method can be used in turn and, if a certain positioning method is not available at a particular moment, the next positioning method is selected for use.

Next, the method proceeds to step 406, where it is examined whether the value (or values) of the parameter (or parameters) QoP_APPn_REQ, which indicate the quality of the positioning data requested by application n, is greater than or equal to the expected value (or values) of the parameter (or parameters) QoP_METx_EXP, which describe the quality of the positioning data provided by positioning method x. The value of parameters QoP_APPn_REQ and QoP_METx_EXP may be a single value, more than one value, or an average of several values. If the value (or values) of the parameter (or parameters) provided by positioning method x is not equal to better than that requested by application n, the method returns to step 403, where the next possible available positioning method is examined and steps 403 to 406 are repeated until a positioning method is found which provides as its default value a value (or values) in accordance with the parameter (or parameters) which indicate the quality of the positioning data requested by application n.

At step 407, the positioning method POS_METHODx identified during steps 402 to 406 is requested for positioning data and the value (or values) QoP_METx_ACT of the parameter (or parameters) which describe the quality actually achieved by the positioning data provided by POS_METHODx. At step 407, the PMSD establishes a connection with said positioning method and receives the positioning data produced by the positioning method. At the next step 408, it is examined whether the value (or values) of the parameter (or parameters) QoP_METx_ACT which describes the quality actually achieved by the positioning data provided by POS_METHODx is equal to or better than the value (or values) of the parameter (or parameters) QoP_APPn_REQ which indicate the quality of the positioning data requested by the application. If the parameter (or parameters) QoP_METx_ACT actually achieved is not equal to or better than the requested QoP_APPn_REQ parameter (or parameters), the method returns to step 403, where the variable indicating the positioning method to be considered is incremented once more. Subsequently, the next positioning method is tested at steps 404 to 408.

If the condition at step 404 is now false (i.e. x is not less than or equal to maxMethod), all positioning methods have been tested, and none of them achieves the specifications given to the PMSD by the user and/or application in question at that moment in time. In this case, the method proceeds to step 411, where several different actions may be taken depending on the implementation. The simplest implementation is to inform the application and/or user, via the application, that none of the available positioning methods can provide positioning data of sufficient quality at that moment. The PMSD can also provide the application with the result from the positioning method that was tested last (QoP_METx-1) together with its quality parameters, or the result and quality parameters from the method that gave the best result. In addition, the application can be provided with a notification to be transmitted to the user, possibly containing a warning that the quality requirement or requirements has/have not been met, and the QoP parameter or the QoP parameters whose requirement the positioning data did not fulfil.

In a third example implementation, the positioning data from the first positioning method (MET1) according to the order of priority defined by the user, together with its quality parameters (QoP) are returned to the application and a notification to be transmitted to the user is also returned to the application, which may contain a warning that the quality requirement or requirements has/have not been met, as well as the QoP parameter or parameters whose requirement the positioning did not fulfil.

The user can be informed of all results via the application, and can be requested to make a choice, which can be, for example, selection of a positioning method that best fulfils the application's positioning request, for instance on the basis of positioning accuracy, or other criteria. The application can also be provided with the positioning data together with the QoP parameters supplied by the positioning method whose result is closest in terms of QoP parameters to the requirements set by the application. For instance, if none of the positioning methods in use provides the accuracy required by the application, the PMSD can return the most accurate positioning result achieved. In this case, too, a notification to be transmitted to the user is returned to the application, which may contain a warning that the quality requirement or requirements has/have not been met, and the QoP parameter or parameters whose requirement the positioning data did not fulfil.

If the parameter or parameters which describe the quality of the positioning data actually achieved QoP_METx_ACT is/are equal to or better than the parameter value (or values) QoP_APPn_REQ requested by the application, the method proceeds to step 409, where the expected value (or expected values) QoP_METx_EXP is/are updated with QoP_METx_ACT, and the positioning data is returned to the application. The PMSD can update the expected value (or values) QoP_METx_EXP of the parameter (or parameters) relating to the positioning data of each positioning method continuously, for example at certain intervals. Updating the expected value is particularly advantageous when several applications use the same positioning method, in which case other applications not only receive the positioning data they request, but also get direct access to the expected value (or values) QoP_METx_EXP updated by the PMSD. FIG. 5 presents a signalling diagram showing the interaction between two different applications and a positioning method selection device PMSD according to the invention. By way of example, two different applications APP1 and APP2 are shown using the PMSD. First, at step 501, application APP1 establishes a connection to the PMSD. Then, at step 502, the PMSD generates a value (or values) QoP_APP1_REQ for the parameter (or parameters) which indicate the quality of the positioning data requested by the application. Advantageously, QoP_APP1_REQ is of a type required by the application in question. QoP_APP1_REQ is stored in register 304 of the PMSD, as can be seen from FIG. 3, and an acknowledgement (ref. 515) that the parameter (or parameters) has/have been generated is sent to the application.

At step 503, application APP1 sends the PMSD a positioning request whereupon, at step 504, the PMSD executes the algorithm according to FIG. 4, in an attempt to find a positioning method which realises the parameter or parameters QoP_APP1_REQ which indicate the quality of the positioning data required by the application. Next, at step 505, application APP2 also establishes a connection to the PMSD whereupon, at step 506, the PMSD creates a parameter value (or values) QoP_APP2_REQ, which describes the quality of the positioning data requested by application APP2. At the same time, the PMSD sends an acknowledgement (ref. 516) indicating creation of the parameter or parameters to application APP2.

At step 507, the PMSD sends positioning data to application APP1. At the next step, 508, application APP2 sends a positioning request to the PMSD. If the parameter (or parameters) QoP_APP2_REQ which indicate the quality of the positioning data requested by application APP2 corresponds to the parameter (or parameters) QoP_APP1_REQ for application APP1, the PMSD can send the same positioning data to application APP2. In this case the PMSD does not have to examine different positioning methods, but can send the positioning data already produced to the application APP2 as well. If the positioning data sent to application APP1 cannot be sent to application APP2, for example as a result of different quality requirements, or if a different parameter (or parameters) has/have been defined for application APP2, the PMSD operates as it does at step 504. Next, at steps 511 and 513, application APP1 and application APP2 close their connections with the PMSD, whereupon the PMSD deletes the parameters QoP_APP1_REQ, step 512, and QoP_APP2_REQ, step 514, for said applications from its register and provides the applications with an acknowledgement that the parameters have been deleted, steps 517 and 518.

It should be noted that the order of the positioning requests made by applications APP1 and APP2 and the time taken for the requests can vary. Furthermore, in an alternative embodiment, said parameters are not deleted but are retained and may be used later, if needed. The PMSD can be provided with quality requirements when a new application is installed, and in this case it is not necessary to provide the PMSD with quality requirements in connection with every positioning request.

FIG. 6 presents a signalling diagram showing the operation of a device according to the invention when there are two different positioning methods in use. By way of example, the PMSD device is shown using two different positioning methods POS_MET1, POS_MET2, of which the user has selected POS_MET2 as the first-choice positioning method. At step 601, positioning method POS_MET1 registers with the PMSD. Registration may take place, for example, when an external GPS system is connected to the terminal via a serial port, or in such a way that a positioning method that has been inoperative becomes operative, for example because the geographical conditions have improved, or a positioning method integrated in the terminal is activated. The PMSD creates a default value (or values) for the parameter (or parameters) QoP_MET1_DEF which describes the quality of the positioning data provided by the positioning method, step 625, and stores it in the register (ref. 306 in FIG. 3), at the same time increasing by one the value of the variable maxMethod, which indicates the total number of available positioning methods. At step 602, the PMSD sends positioning method POS_MET1 an acknowledgement of its registration. At step 603, positioning method POS_MET2 registers, whereupon the PMSD creates a value (or values) for the parameter (or parameters) QoP_MET2_DEF, step 626, increases the value of maxMethod by one and sends an acknowledgement of the registration, step 604.

At step 605, the user defines settings for the positioning method parameters, such as an order of preference or the desired accuracy of the positioning data. Other quality criteria not mentioned herein may also be used. At step 627, the PMSD stores the user's settings in the register (ref. 308 in FIG. 3) as the parameter (or parameters) POS_PREF and sends an acknowledgement to the user, step 606.

At step 607, the user activates application APP1 and application APP1 establishes a connection to the PMSD, step 608. At step 628, the PMSD creates a value (or values) QoP_APP1_REQ for the parameter (or parameters) indicating the quality of the positioning data required by application APP1, which can be, for example, a positioning accuracy automatically defined by application APP1, or a positioning accuracy defined by the user. At step 609, the PMSD provides application APP1 with an acknowledgement in response to establishment of the connection, after which application APP1 makes a positioning request to the PMSD at step 610.

At step 629, the PMSD executes the algorithm according to FIG. 4. At step 611, the PMSD first sends a positioning request to positioning method POS_MET2, which the user has selected as the first-choice positioning method. At step 612, positioning method POS_MET2 sends the positioning data as well as the value (or values) of the parameter (or parameters) QoP_MET2_ACT actually achieved to the PMSD. At step 630, the PMSD stores the value of the parameter (or parameters) QoP_MET2_ACT actually achieved as the expected value (or values) QoP_MET2_EXP. The PMSD algorithm is executed again, whereupon the PMSD notices that the value (or values) of the parameter (or parameters) actually achieved are not equal to or better than those which the application or user defined as the value (or values) of the parameter (or parameters) QoP_APP1_REQ. Thus, the next positioning method in the order preference defined by the user, i.e. POS_MET1, is now tested.

At step 613, the PMSD sends a positioning request to positioning method POS_MET1, which sends the positioning data and the value (or values) of the parameter (or parameters) QoP_MET1_ACT to the PMSD at step 614. At step 631, the PMSD stores the value (or values) of the parameter (or parameters) QoP_MET1_ACT actually achieved as the expected value QoP_MET1_EXP and the PMSD algorithm is executed. Now, the expected value (or values) QoP_MET1_EXP is equal to or better than the value (or values) QoP_APP1_REQ defined for application APP1, whereupon at stage 615 the positioning data is sent to application APP1.

At step 616, the application terminates the connection to the PMSD, whereupon at step 632, the PMSD can delete the parameter (or parameters) QoP_APP1_REQ from its register and acknowledge that the connection has been terminated, step 617. At this point, application APP1 informs the user that the search for positioning data has been terminated, and the user can thus stop the application APP1 at step 618, if desired. Alternatively, application APP1 can continue running at step 616, but nevertheless informs the PMSD that it no longer requires positioning data at that time, whereupon application APP1 terminates its connection to the PMSD. When it requires positioning data again, application APP1 registers with the PMSD once more, for as long as required to receive the positioning data.

FIG. 7 shows an alternative implementation of a system comprising several applications and several positioning methods, implemented without a PMSD device. The system comprises two different applications which use the positioning methods, for example a WAP browser 701 and a navigation guide 702. It also comprises a user interface 703, with which the user can define (ref. 109, 110) parameters and conditions relating to positioning tasks to be performed by the applications, and different positioning methods 704 to 708, including a GPS receiver 705 integrated in the terminal and, for example, an external GPS device 706 which can be connected to the terminal via a serial port. In this system, each application must be independently in communication with each available positioning method, must process the positioning data received from the positioning methods and choose which positioning method the application should use at a particular time. Furthermore, if the user also wishes to set conditions relating e.g. to the quality of the positioning data required by each application, they must be made for each application separately.

FIG. 8 presents a block diagram of a mobile station 800 according to an embodiment of the invention. A processor 801 controls the various functional blocks involved in the operation of the mobile terminal: a random access memory 802 RAM, a radio frequency block RF 803, an antenna 804, a non-volatile or read only memory 805 ROM, as well as a user interface UI 806 having at least a display and a keyboard. In FIG. 8, the mobile terminal 800 is also shown to include a GPS receiver 807 GPS. The processor's 801 operating instructions, that is program code corresponding to the mobile station's basic functions, is stored in the read-only memory 805 ROM and can be executed as required by the processor 801 e.g. under control of the user of the terminal. In accordance with the program code, the processor uses the RF block 803 to form a connection with a mobile communication network, enabling the mobile terminal 800 to transmit information to and receive information from the mobile communication network over a radio path.

In this example, the mobile terminal also comprises hardware and program code enabling it to use an E-OTD positioning method provided by the mobile communication network. It further comprises a positioning method selection device (PMSD) 808 implemented according to the present invention. The PMSD 808 receives requests for positioning data from applications running in the mobile terminal 800, for example a navigation system and/or a Web browser. According to program code stored in the ROM, and executed by the processor 801, the PMSD 808 monitors the operational state of the GPS receiver and the E-OTD positioning method. In accordance with the method previously described, the PMSD 808 provides the applications with positioning data that fulfils specified quality requirements and conditions. The PMSD 808 receives the quality requirements and conditions for the selection of the positioning methods from the applications and/or directly from the user via the user interface UI 806. The PMSD 808 uses the RAM 802 as a working memory to maintain the registers that store the various quality parameters and to perform comparisons between parameters describing the quality of positioning data requested and that actually achieved. The PMSD 808 also provides indications to the user via the display of the user interface UI 806, for example in a situation where neither the internal GPS receiver 807 nor the E-OTD positioning method can provide positioning data of sufficient quality to fulfil the requirements of the applications/and or user.

Implementations and embodiments of the invention have been described herein by of way of example. It is obvious to a person skilled in the art that the invention is not restricted to the details of the above-described embodiments and that the invention can be implemented in other forms without departing from the characteristics of the invention. The embodiments described should be regarded as illustrative, not restrictive. Thus, possibilities for the implementation and use of the invention are restricted only by the appended claims. Hence, different implementation alternatives for implementing the invention defined by the claims, including equivalent implementations, are included within the scope of the invention.

The invention claimed is:

1. A processor usable medium having processor readable program code embodied therein for causing a processor to determine the position of a mobile terminal device, the processor readable program code comprising:

processor readable program code for causing a processor to make a position method selection device located inside the mobile terminal device available for more than one application executable by the mobile terminal device and to arrange for the position method selection device to centrally manage a use of one or more positioning methods, processor readable program code for causing a processor in said position method selection device, to receive at least one condition for selecting a positioning method, processor readable program code for causing a processor in said position method selection device, to receive a request for positioning data that indicates the position of the mobile terminal device, processor readable program code for causing a processor in said position method selection device, to use a positioning method that fulfils said at least one condition for selection of a position method for producing said position data, and processor readable program code for causing a processor to deliver said position data from said position method selection device to an application.

2. A processor useable medium according to claim 1, wherein the at least one condition is received from a different application than the request for positioning.

3. A processor usable medium having processor readable program code embodied therein for causing a processor to determine the position of a mobile terminal device, the processor readable program code comprising:

processor readable program code for causing a processor to make a position method selection device located inside the mobile terminal device available for more than one application executable by the mobile terminal device and to arrange for the position method selection device to centrally manage a use of one or more positioning methods, processor readable program code for causing a processor in said position method selection device, to receive positioning data from said one or more positioning methods, processor readable program code for causing a processor in said position method selection device, to receive a condition for selecting a positioning method, and processor readable program code for causing a processor in said position method selection device, to determine a portion of the positioning data that corresponds with such a positioning method that fulfils said condition for selecting a positioning method, said portion of the positioning data being used for indicating the position of the mobile terminal device.

4. A processor useable medium according to claim 3, wherein said condition for selecting a positioning method is one of the following: an order of preference relating to selection of a positioning method, a required quality of the positioning data that the positioning methods of a particular application is permitted to use, a required positioning accuracy, a required reliability of positioning, a required interval with which positioning data is updated, a time that is permitted to elapse before the positioning data is provided after a positioning method is activated, and a cost of using a positioning method.

5. A processor usable medium having processor readable program code embodied therein for causing a processor to determine the position of a mobile terminal device, the processor readable program code comprising:
processor readable program code for causing a processor to make a position method selection device located inside the mobile terminal device available for more than one application executable by the mobile terminal device and to arrange for the position method selection device to centrally manage a use of more than one positioning methods
processor readable program code for causing a processor in said position method selection device, to receive positioning data from said more than one positioning method, and
processor readable program code for causing a processor in said position method selection device, to combine said positioning data received from said more than one positioning methods into a combined positioning data, said combined positioning data being used for indicating the position of the mobile terminal device.

6. A processor useable medium according to claim 5, further comprising processor readable program code for causing a processor in said position method selection device to determine whether the positioning data received from said more than one positioning methods fulfils a quality requirement received from a particular application.

7. A processor usable medium having processor readable program code embodied therein for causing a processor to determine the position of a mobile terminal device, the processor readable program code comprising:
processor readable program code for causing a processor to make a position method selection device located inside the mobile terminal device available for more than one application executable by the mobile terminal device and to arrange for the position method selection device to centrally manage a use of one or more positioning methods,
processor readable program code for causing a processor in said position method selection device, to receive from a first application a first request for positioning data that indicates the position of the mobile terminal device,
processor readable program code for causing a processor in said position method selection device, to receive from a second application program a second request for positioning data that indicates the position of the mobile terminal device, and
processor readable program code for causing a processor, as a response to said second request, to deliver position data obtained as a response to the first request from said first application program to said second application program.

8. A processor useable medium according to claim 7, further comprising processor readable program code for causing a processor in said position method selection device to check whether the position data received from different positioning methods fulfils a quality requirement set by a particular application as a prerequisite for forming said position data.

9. A method for locating a mobile terminal device comprising:
configuring a position method selection device located inside the mobile terminal device for operative association with more than one application executable by the mobile terminal device and to manage centrally one or more positioning methods; and said method further comprising:
receiving at least one condition relating to a positioning in question;
receiving from an application a request for positioning the mobile terminal;
selecting a positioning method which fulfils said at least one condition;
producing with selected positioning method a positioning data which indicates the position of the mobile terminal device; and
sending said positioning data to said application.

10. The method according to claim 9 wherein said condition, relating to the positioning in question, is received from a different application than said request for positioning.

11. An apparatus comprising:
a processor located inside a mobile terminal device, configured for operative association with more than one application executable by the mobile terminal device and one or more positioning methods, and being arranged to centrally manage said positioning methods; and
wherein said processor is further configured:
to select a positioning method that fulfils a condition or conditions received from an application, and
to produce, with the selected positioning method, a positioning data of a mobile terminal device for an application.

12. An apparatus according to claim 11, wherein said condition comprises one of the following: an order of preference relating to selection of a positioning method, a required quality of positioning data that the positioning methods of a particular application is permitted to use, a required positioning accuracy, a required reliability of positioning, a required interval with which positioning data is updated, a time that is permitted to elapse before the positioning data is provided after a positioning method is activated, a cost of using a positioning method.

13. A method for locating a mobile terminal device comprising:
configuring a position method selection device located inside the mobile terminal device for operative association with more than one application executable by said mobile terminal device and to manage centrally one or more positioning methods; said method further comprising:
receiving positioning data from said one or more positioning method;
receiving a condition relating to the positioning in question;
determining a portion of the positioning data that corresponds to such a positioning method that fulfils said condition;
using said portion of the positioning data for indicating the position of the mobile terminal device.

14. A method according to claim 13, wherein said condition for relating to the positioning in question is one of the following: an order of preference relating to selection of a positioning method, a required quality of the positioning data that the positioning methods of a particular application is permitted to use, a required positioning accuracy, a required reliability of positioning, a required interval with which positioning data is updated, a time that is permitted to elapse before the positioning data is provided after a positioning method is activated, and a cost of using a positioning method.

15. A method according to claim 13, wherein said condition relating to the positioning in question is entered into the positioning method selection device by the user via a user interface of the mobile terminal device.

16. A method according to claim 13, wherein a particular application sets a quality requirement for the positioning, and if said positioning data received from said one or more positioning method does not fulfill the quality requirement, the positioning method selection device informs said particular application of this unfulfilled requirement.

17. The method according to claim 13 wherein said condition, relating to the positioning in question, is received from a user of the mobile terminal device.

18. An apparatus comprising:
a processor located inside a mobile terminal device, configured for operative association with more than one application executable by the mobile terminal device and one or more positioning methods, said processor being arranged to centrally manage said positioning methods, said processor further configured to determine a portion of a positioning data received from the positioning methods, which corresponds to such a positioning method that fulfils a condition received from an application.

19. An apparatus according to claim 18, wherein said condition comprises one of the following: an order of preference relating to selection of a positioning method, a required quality of positioning data that the positioning methods of a particular application program is permitted to use, a required positioning accuracy, a required reliability of positioning, a required interval with which positioning data is updated, a time that is permitted to elapse before the positioning data is provided after a positioning method is activated, a cost of using a positioning method.

20. An apparatus according to claim 18, further comprising a user interface for allowing a user of the mobile terminal device to enter said condition into an application, from which the positioning method selection device receives the condition.

21. A method for locating a mobile terminal device comprising:
configuring a position method selection device located inside the mobile terminal device for operative association with more than one application executable by the mobile terminal device and to manage centrally one or more positioning methods; and said method further comprising:
receiving positioning data from said one or more positioning method;
receiving a condition relating to a positioning in question;
combining said positioning data received from the positioning methods into a combined positioning data; and
using the combined positioning data for indicating the position of the mobile terminal device.

22. A method according to claim 13, wherein said positioning method selection device determines whether the positioning data received from said one or more positioning method fulfils a quality requirement received from a particular application and combines positioning data from more than one positioning method in order to fulfill said quality requirement.

23. A method according to claim 22, wherein said positioning method selection device provides said combined positioning data to said particular application.

24. A method according to claim 23, wherein said positioning method selection device provides said combined positioning data to said application in a format requested by said particular application program.

25. An apparatus comprising:
a processor located inside a mobile terminal device configured for operative association with more than one application executable by the mobile terminal device and one or more positioning methods, and being arranged to centrally manage said positioning methods, said processor further comprising a combiner to form a positioning data, which indicates a position of a mobile terminal device, on grounds of positioning data received from different positioning methods.

26. An apparatus according to claim 25, wherein said processor is further arranged to check whether the positioning data received from different positioning method fulfils a quality requirement set by a particular application as a prerequisite for forming said positioning data.

27. An apparatus according to claim 26, wherein said positioning method selection device is arranged to provide said positioning data to said particular application in a format requested by said particular application.

28. A method for locating a mobile terminal device comprising:
configuring a position method selection device located inside a mobile terminal device for operative association with more than one application executable by the mobile terminal device and to manage centrally one or more positioning methods; and said method further comprising:
receiving from a first application a request for positioning the mobile terminal;
producing with a positioning method a positioning data which indicates the position of the mobile terminal device;
receiving from a second application program a request for positioning the mobile terminal; and
sending said positioning data based on the request from the first application program to the second application.

29. A method according to claim 28, wherein said sending of the positioning data to said second application if the positioning data fulfils a quality requirement set by the second application.

30. An apparatus comprising:
a processor located inside a mobile terminal device configured for operative association with more than one application executable by the mobile terminal device and one or more positioning methods, and further said processor being arranged:
to centrally manage said positioning methods; and
to deliver a positioning data of the mobile terminal device based on a request from an application also to another application.

31. An apparatus according to claim 30, wherein said processor is further arranged to check whether said positioning data fulfils a quality requirement set by said another application as a prerequisite for delivering the positioning data to said another application.

* * * * *